April 8, 1924.
W. G. MILNE
APPARATUS FOR GALVANIZING CHAIN
Filed Oct. 13 1922
1,489,393
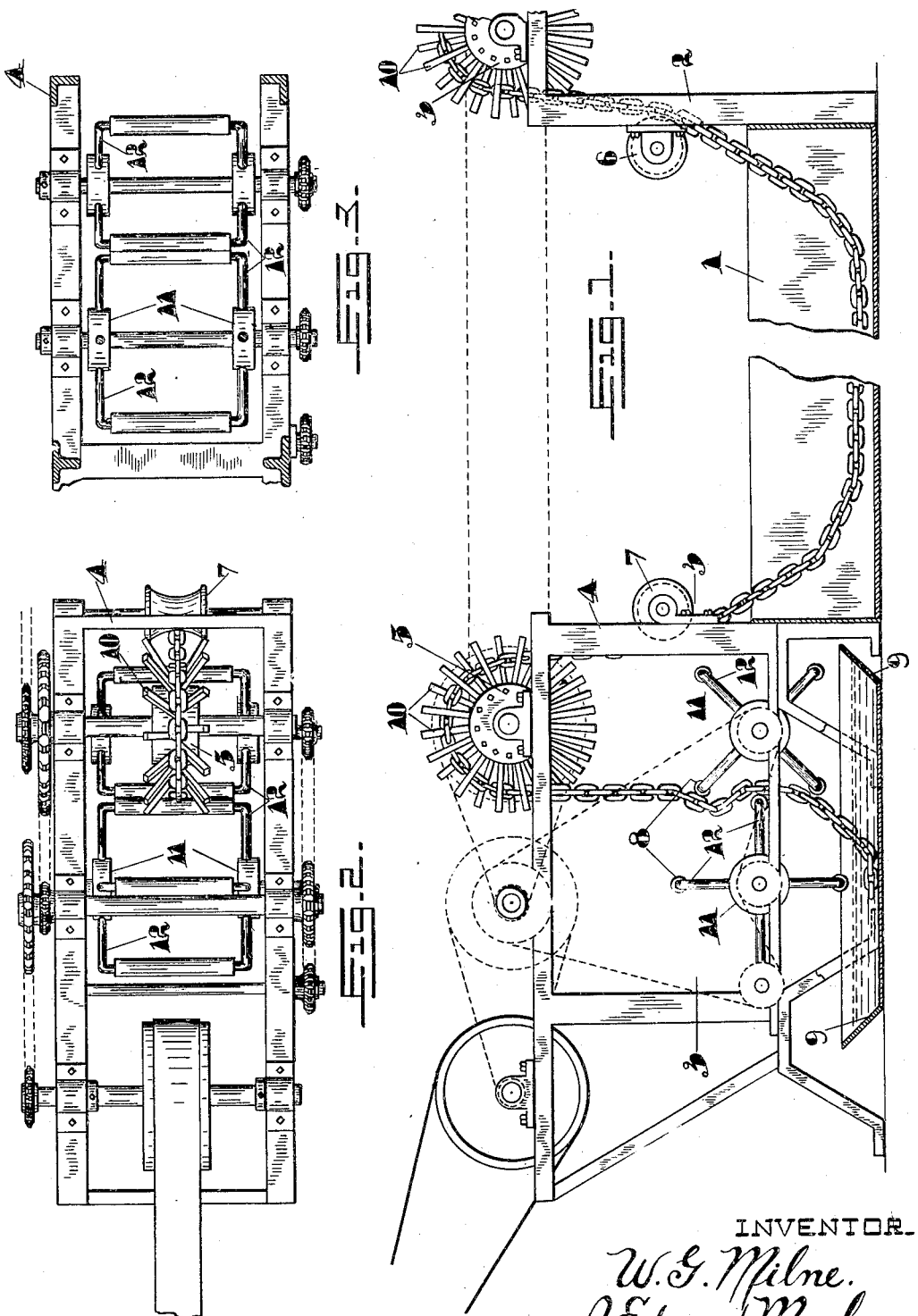

Patented Apr. 8, 1924.

1,489,393

UNITED STATES PATENT OFFICE.

WINFORD G. MILNE, OF HAMILTON, ONTARIO, CANADA, ASSIGNOR TO N. SLATER COMPANY, LIMITED, OF HAMILTON, ONTARIO, CANADA.

APPARATUS FOR GALVANIZING CHAIN.

Application filed October 13, 1922. Serial No. 594,393.

*To all whom it may concern:*

Be it known that I, WINFORD G. MILNE, of the city of Hamilton, in the county of Wentworth, Province of Ontario, Canada, a subject of the King of Great Britain, have invented certain new and useful Improvements in Apparatus for Galvanizing Chain, of which the following is a specification.

This invention relates to apparatus used for galvanizing chain. With the apparatus as heretofore known, it is found that the chain is very unevenly coated, which not only spoils the appearance of the chain, but is also wasteful of the spelter with which the chain is coated.

The object of my invention is therefore to devise apparatus by means of which the chain may be evenly coated and which will at the same time keep the links of the chain agitated relative to one another and thus prevent the links being secured to one another while the spelter is setting.

I attain my object by means of the constructions hereinafter described and illustrated in the accompanying drawings in which—

Fig. 1 is a side elevation of my improved apparatus;

Fig. 2 a plan view of part of the same; and

Fig. 3 a section on the line 3—3 in Fig. 1.

In the drawings like numerals of reference indicate corresponding parts in the different figures.

1 is a tank which contains the spelter with which the chain is to be coated. At one end of this tank is the frame 2 on which is journalled the feed wheel 3 over which the chain is fed to the tank 1.

At the other end of the tank 1 is the frame 4 on which is journalled the wheel 5 over which the chain is withdrawn from the spelter tank 1.

On the frame 2 just above the top of the tank is journalled the idler guide pulley 6, which guides the chain from the feed wheel 3 to the tank 1. On the frame 4 opposite the pulley 6 is also journalled an idler guide pulley 7, which guides the chain from the spelter tank 1 to the wheel 5.

From the wheel 5 the chain passes downwardly between the two agitators 8 to the water tank 9 where it is cooled and into which any excess spelter shaken from the chain by the agitators drops.

From this tank 9 the chain is withdrawn in any suitable manner.

The wheels 3 and 5 are each positively driven at the same rate of speed, and sufficient chain will always be between them so that the chain will always hang down into the spelter in the tank 1.

As chains of various sizes have to be coated, I have devised a particular construction of the wheels 3 and 5 suitable for any size chain so as to avoid the necessity of having to change wheels whenever it is desired to coat a fresh size of chain.

These wheels 3 and 5 are therefore constructed of a hub and a plurality of radially extending spokes. These spokes are, however, bent alternately outwardly to right and left so that a V-shaped space is formed between the spokes.

From this construction it follows that when a small chain is being coated, it will be between the spokes 10 close to the hub, but if a larger chain is being coated, it will lie between the spokes nearer their outer ends.

The agitators 8 are also of peculiar construction, each comprising a pair of hubs 11 into which extend the ends of U-shaped arms 12. On reference to Fig. 1, it will be seen that these agitators are driven so that they will rotate in opposite directions and that the U-shaped arms on one agitator alternate with those of the other agitator so that the chain passing down between them is continually knocked in opposite directions by the arms of the two agitators. The arms 12 of the agitators will preferably be provided with anti-friction rollers.

The drive for the agitators is also so arranged that the agitators are rotated at a much more rapid rate than the rate at which the chain passes through the apparatus.

The wheels and agitators will, of course, be suitably driven in the manner hereinbefore described by means of suitable gears or pulleys and belts. One suitable arrangement of drive is illustrated in dotted lines in Fig. 1.

The excess spelter which drops into the tank 9 may be removed in any desired manner and again melted for use.

From the above description it will be seen that I have devised apparatus which will satisfactorily attain the objects of my invention as set forth in the preamble of this specification. The driving of the rotary agitators at a greater rate of speed than the travel of the chain through the apparatus is very important as by this I obtain the best results in getting an evenly coated chain and I also prevent any possibility of the links of the chain sticking together when the coating has set.

With the particular construction of the wheels 3 and 5 described there is also a positive feed and withdrawal of the chain, as the latter cannot possibly slip.

It will be understood, of course, that various changes may be made in the constructional details which will fall within the scope of my invention.

What I claim as my invention is:—

1. In apparatus for coating chain, the combination of a dipping tank into which the chain is led; means for withdrawing the chain from the dipping tank; and agitators for agitating the chain to remove excess coating, the movement of said agitators at the point of agitation being substantially in the same direction as the travel of the chain, but at a greater speed.

2. In apparatus for coating chain, the combination of a dipping tank into which the chain is led; means for withdrawing the chain from the dipping tank; and means for agitating the chain to remove excess coating comprising a pair of agitators between which the chain is led, each having a plurality of radially extending arms, the arms of one agitator alternating with the arms of the other agitator to beat the chain in opposite directions.

3. In apparatus for coating chain, the combination of a dipping tank into which the chain is led; means for withdrawing the chain from the dipping tank; and means for agitating the chain to remove excess coating comprising a pair of agitators between which the chain is led, each having a plurality of radially extending arms, the arms of one agitator alternating with the arms of the other agitator to beat the chain in opposite directions, the movement of said arms when beating the chain being in the same direction as, but at a greater speed than the movement of the chain.

4. In apparatus for coating chain, the combination of a dipping tank into which the chain is led; a wheel adapted to withdraw the chain from the tank comprising a hub having a plurality of radially directed spokes, said spokes being alternately bent outwardly to either side to form between them a V-shaped groove; and means for agitating the chain to remove excess coating.

5. In apparatus for coating chain, the combination of a dipping tank into which the chain is led; a wheel adapted to withdraw the chain from the tank comprising a hub having a plurality of radially directed spokes, said spokes being alternately bent outwardly to either side to form between them a V-shaped groove; and agitators for agitating the chain to remove excess coating, the movement of said agitators at the point of agitation being substantially in the same direction as the travel of the chain, but at a greater speed.

6. In apparatus for coating chain, the combination of a dipping tank into which the chain is led; a wheel adapted to withdraw the chain from the tank comprising a hub having a plurality of radially directed spokes, said spokes being alternately bent outwardly to either side to form between them a V-shaped groove; and means for agitating the chain to remove excess coating comprising a pair of agitators between which the chain is led, each having a plurality of radially extending arms, the arms of one agitator alternating with the arms of the other agitator to beat the chain in opposite directions.

7. In apparatus for coating chain, the combination of a feed wheel over which the chain is led; a dipping tank; a wheel adapted to withdraw the chain from the tank, each of said wheels comprising a hub having a plurality of radially directed spokes, said spokes being alternately bent outwardly to either side to form between them a V-shaped groove; and means for agitating the chain to remove excess coating.

Signed this 19th day of September 1922.

WINFORD G. MILNE.

Witnesses:
  E. G. BUCKLY,
  EDNA M. GREEN.